United States Patent
Ishii et al.

(10) Patent No.: US 7,450,802 B2
(45) Date of Patent: Nov. 11, 2008

(54) OPTICAL FIBER COUPLER AND OPTICAL FIBER THEREFOR

(75) Inventors: Yuu Ishii, Chiba (JP); Ryokichi Matsumoto, Chiba (JP); Daiichiro Tanaka, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/760,374

(22) Filed: Jan. 21, 2004

(65) Prior Publication Data

US 2004/0170358 A1    Sep. 2, 2004

(30) Foreign Application Priority Data

Jan. 21, 2003  (JP)  ............... P2003-012664

(51) Int. Cl.
*G02B 6/26*  (2006.01)
*G02B 6/42*  (2006.01)

(52) U.S. Cl. .......................... 385/43; 385/96

(58) Field of Classification Search .................. 385/43, 385/95, 96
See application file for complete search history.

(56) References Cited

U.S. PATENT DOCUMENTS

| | | | |
|---|---|---|---|
| 4,556,279 A | 12/1985 | Shaw et al. | 385/30 |
| 4,834,481 A | 5/1989 | Lawson et al. | 385/44 |
| 4,869,570 A | 9/1989 | Yokohama et al. | 385/24 |
| 5,412,745 A | 5/1995 | Weidman et al. | 385/43 |
| 6,445,855 B1 * | 9/2002 | Stowe et al. | 385/43 |
| 6,701,046 B1 * | 3/2004 | Pianciola et al. | 385/43 |
| 2002/0041737 A1 | 4/2002 | Ishikawa et al. | 385/43 |
| 2002/0136508 A1 | 9/2002 | Donno et al. | 385/98 |

FOREIGN PATENT DOCUMENTS

| | | |
|---|---|---|
| CN | 1072802 C | 10/2001 |
| EP | 0 577 259 A1 | 5/1993 |
| EP | 1 056 170 A2 | 11/2000 |
| JP | 60154215 A | 8/1985 |
| JP | 07-301722 A | 11/1995 |
| JP | 2000-338358 A | 12/2000 |

OTHER PUBLICATIONS

G. Georgiou et al., "Low-Loss Single-Mode Optical Couplers", IEE Proceedings- J Optoelectronics, IEE, XX, vol. 132, Part J, No. 5, published Oct. 1985.

* cited by examiner

*Primary Examiner*—Kevin S Wood
(74) *Attorney, Agent, or Firm*—Sughrue Mion, PLLC

(57) ABSTRACT

An optical fiber coupler is comprised of a fusion-elongated portion 15 in which an optical fiber 11 which is designed and fabricated for use at a wavelength in the vicinity of 1.55 μm and an optical fiber 12 which is designed and fabricated for use at a wavelength in the vicinity of 0.98 μm are fused and elongated. The propagation constant difference between optical fibers 11 and 12 is $10^{-4}$ rad/μm or smaller.

8 Claims, 14 Drawing Sheets

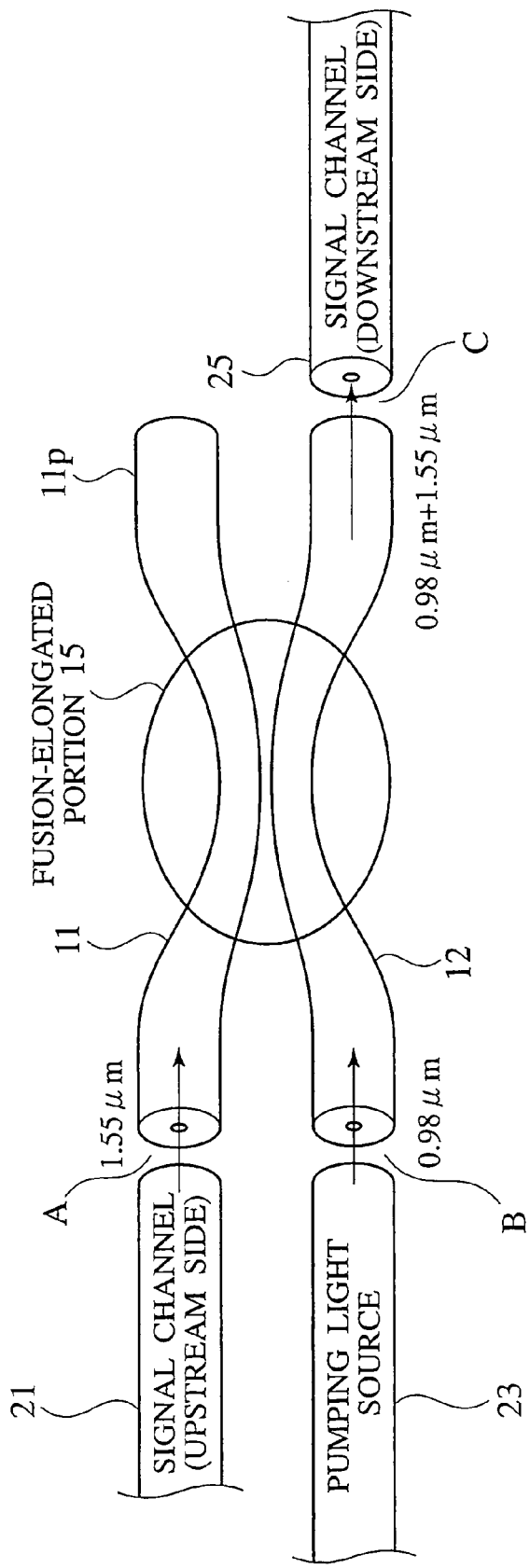

FIG.5A
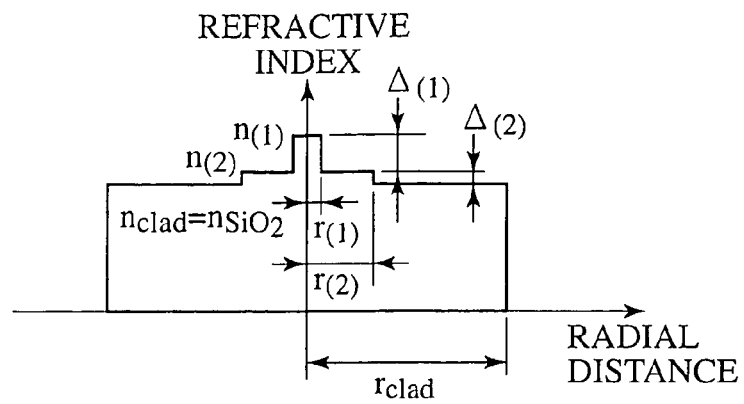
FIG.5B
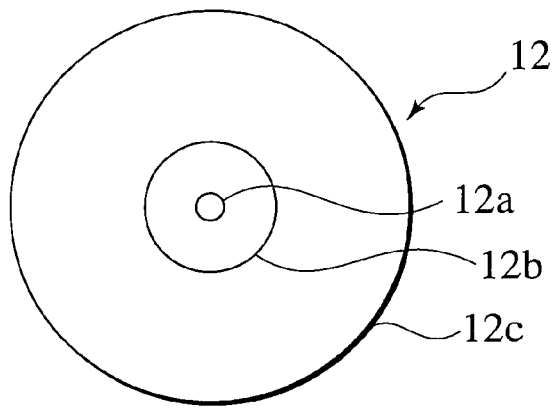
FIG.6
| | FIRST CORE RADIUS r(1) (μm) | FIRST CORE Δ Δ(1) (%) | SECOND CORE RADIUS r(2) (μm) | SECOND CORE Δ Δ(2) (%) |
|---|---|---|---|---|
| (a) 1.55 μm-BAND OPTICAL FIBER | 4.4 | 0.3~0.55 | — | — |
| (b) 0.98 μm-BAND OPTICAL FIBER | 2.4 | 0.6~1 | — | — |
| (c) IMPROVED 0.98 μm-BAND OPTICAL FIBER (1) | 2.4 | 0.6~1 | 20 | 0.1 |
| (d) IMPROVED 0.98 μm-BAND OPTICAL FIBER (2) | 2.4 | 0.6~1 | 20 | 0.02 |
| (e) IMPROVED 0.98 μm-BAND OPTICAL FIBER (3) | 2.4 | 0.6~1 | 10 | 0.02 |

United States Patent US 7,450,802 B2

OPTICAL FIBER COUPLER AND OPTICAL FIBER THEREFOR

Priority is claimed on Japanese application No. 2003-012664, filed Jan. 21, 2003, the content of which is incorporated herein by reference.

BACKGROUND OF THE INVENTION

The present invention relates to an optical fiber coupler used in the fields of optical information communication or optical measurement or the like, and more specifically, to a WDM (Wavelength-Division Mutiplexer) coupler that multiplexes/demultiplexes different wavelengths and an optical fiber for the optical fiber coupler.

An EDFA (Erbium Doped Fiber Amplifier) is the main kind of amplifier recently used in the field of optical information communication. In an EDFA, pumping light having a wavelength in the vicinity of 1.48 µm or 0.98 µm is incident to excite a gain medium, i.e. an EDF (Erbium Doped Fiber) or a composite element thereof (Erbium). Here with a WDM coupler (hereinafter referred to as "optical fiber coupler"), a lightwave having a wavelength in the vicinity of 0.98 µm is incident to the gain medium (EDF) without impairing signal light having a wavelength in the vicinity of 1.55 µm.

Optical fiber couplers include a fusion-elongated type or an optical fiber coupler using a dielectric thin-film filter. A conventional fusion-elongated type optical fiber coupler used for multiplexing/demultiplexing two wavelengths in the vicinity of 0.98 µm and 1.55 µm respectively (hereinafter referred to as "0.98 µm/1.55 µm-band optical fiber coupler") may consist of two optical fibers which are designed and fabricated for use at a wavelength in the vicinity of 0.98 µm (hereinafter referred to as "0.98 µm-band optical fiber") combined together, or a 0.98 µm-band optical fiber and an optical fiber which is designed and fabricated for use at a wavelength in the vicinity of 1.55 µm (hereinafter referred to as "1.55 µm-band optical fiber") combined together. The combination of two 1.55 µm-band optical fibers is not used because pumping light having the wavelength of 0.98 µm is not propagated at single mode inside a 1.55 µm-band optical fiber, thereby preventing stable characteristics from being realized.

Conventional optical fiber couplers are disclosed in U.S. Pat. Nos. 4,834,481, 4,556,279 and 4,869,570.

In the case of an optical fiber coupler combined with two 0.98 µm-band optical fibers (with reference to FIGS. 1 and 2, envisaging that a 1.55 µm-band optical fiber 11 is replaced by a 0.98 µm-band optical fiber), a 1.55 µm-band optical fiber 21 and a 0.98 µm-band optical fiber used for the optical fiber coupler are joined at a splicing part A. Then a comparatively large splicing loss occurs due to a MFD (Mode Field Diameter) mismatch at the splicing part A.

For most optical fibers the intensity distribution of a lightwave (electromagnetic field) propagated in the optical fiber is well approximated by Gaussian distribution. A MFD, which is an important factor determining splicing loss, is the length between two points of $1/e^2$ (where the "e" represents the base of the natural logarithm) of maximum value of this intensity distribution. When optical fibers of equivalent MFD are spliced extremely low splicing loss can be attained (under ideal conditions, no loss), but when optical fibers of disparate MFD are spliced, the greater the difference in magnitude of the respective MFDs of the two fibers, the greater the magnitude of the splicing loss becomes. Since this splicing loss is as large as 0.2 dB-0.3 dB, there is significant detriment from the viewpoint of transmission quality in an optical communication system using optical components.

Accordingly, to reduce splicing loss it is preferable that as shown in FIGS. 1 and 2, a 1.55 µm-band optical fiber is used for the optical fiber 11 acting as an optical fiber for a port inputting lightwave having a wavelength in the vicinity of 1.55 µm (in the case of a backward pumping system, a port from which lightwave having the wavelength in the vicinity of 1.55 µm is output).

FIG. 1 shows an example of a first configuration of such an optical fiber coupler. FIG. 2 shows an example of a second configuration of such an optical fiber coupler. The example of the first configuration of FIG. 1 illustrates a connecting method using a forward pumping system, that is, a method of inputting pumping light to the gain medium such as an EDF, from the upstream side of signal flow in the same direction as signal light.

The optical fiber coupler shown in FIG. 1 provides a fusion-elongated portion 15 in which a 1.55 µm-band optical fiber 11 and a 0.98 µm-band optical fiber 13 are fused together and elongated. Signal light is incident from a 1.55 µm-band optical fiber 21 that provides a signal channel to the upstream side, via a splicing part A and into a port at one end of the 1.55 µm-band optical fiber 11. Pumping light is incident from a 0.98 µ-band optical fiber 23 that provides a pumping light source, via a splicing part B and into a port at one end of the 0.98 µm-band optical fiber 13. Further coupled lightwave of the pumping light having the wavelength of 0.98 µm and signal light having the wavelength of 1.55 µm is incident from a port at the other end of the 0.98 µm-band optical fiber 13, via a splicing part C and into an EDF (erbium doped optical fiber 25 for excitation lightwave having a wavelength in the vicinity of 0.98 µm). That is, with this forward pumping system, pumping light is incident into the EDF 25 from the upstream side of the signal channel that is the same direction as that of the signal light, as shown by the direction indicated by the arrows in FIG. 1. A port 11p at the other end of the 1.55 µm-band optical fiber 11 is not used.

The example of a second configuration shown in FIG. 2 illustrates a connection method using a backward pumping system. As shown by the direction of the arrows in FIG. 2, in a backward pumping system the pumping light is incident to the EDF 25 from the downstream side of the signal channel to the opposite direction of the signal light.

In addition to the above described two kinds of pumping light system there is a bi-directional pumping light system in which pumping light is incident from both the signal upstream and downstream sides of the EDF. In this bi directional configuration optical fiber couplers are arranged at both the signal upstream side and the signal downstream side of the EDF. The signal upstream side system operates in the same way as the forward pumping system and the signal downstream side system operates in the same way as the backward pumping system.

SUMMARY OF THE INVENTION

However the optical fiber coupler combined with a 0.98 µm-band optical fiber and a 1.55 µm-band optical fiber as described above is an asymmetrical coupler in which the propagation constants of lightwave having a wavelength in the vicinity of 1.55 µm in the fusion-elongated portion 15 are different for the respective optical fibers 11 and 13. Accordingly, it is not possible that light power of a lightwave having a wavelength in the vicinity of 1.55 µm perfectly transfer from an 1.55 µm-band optical fiber to an 0.98 µm-band optical fiber; in other words complete coupling cannot be achieved. Thus, there is substantial insertion loss of the lightwave having a wavelength in the vicinity of 1.55 μm between the splicing parts A and C in FIG. 1.

Further in an optical fiber coupler combined with two 0.98 μm-band optical fibers there is poor connectivity between an optical fiber for 0.98 μm and a port of a 1.55 μm-band optical fiber (signal light port).

In order to solve the above-mentioned problems the present invention provides optical fiber for an optical fiber coupler and a fusion-elongated type optical fiber coupler that realize superior optical characteristics (coupling characteristics for lightwave having a wavelength in the vicinity of 1.55 μm) and superior connectivity with input/output optical fibers (low splicing loss).

According to a first aspect of the present invention an optical fiber coupler is provided having a fusion-elongated portion formed by fusion-elongating a plurality of optical fibers for lightwaves having respectively different wavelengths, wherein a propagation constant difference of the optical fibers is $10^{-4}$ rad/μm or smaller.

According to a second aspect of the present invention an optical fiber coupler is provided having a fusion-elongated portion formed by fusion-elongating a plurality of optical fibers for lightwaves having respectively different wavelengths, wherein at least one of the plurality of optical fibers is an optical fiber used for the optical fiber coupler for single mode propagation of a lightwave having a wavelength in the vicinity of 0.98 μm, wherein the optical fiber used for the optical fiber coupler comprises a first core, a second core arranged surrounding the first core and having a radius within the range of 10 μm and greater, and a cladding arranged surrounding the second core, and wherein a relative refractive-index difference of the second core and the cladding is 0.1% or smaller.

According to a third aspect of the present invention an optical fiber for an optical fiber coupler is provided comprising a first core; a second core arranged over the first core and having a radius within the range of 10 μm or greater; and a cladding arranged over the second core, wherein a relative refractive-index difference of the second core and the cladding is 0.1% or smaller, and wherein the optical fiber for the optical fiber coupler propagates a single mode of a lightwave having a wavelength in the vicinity of 0.98 μm.

BRIEF DESCRIPTION OF THE DRAWINGS

FIG. 3 schematically illustrates an optical fiber coupler comprised of different types of optical fibers according to an embodiment of the present invention;

FIGS. 5A and 5B show the refractive index profile of an optical fiber having a second core;

FIG. 6 is a table of data on various aspects of different types of optical fibers;

DETAILED DESCRIPTION OF THE PREFERRED EMBODIMENTS

Figure 1:
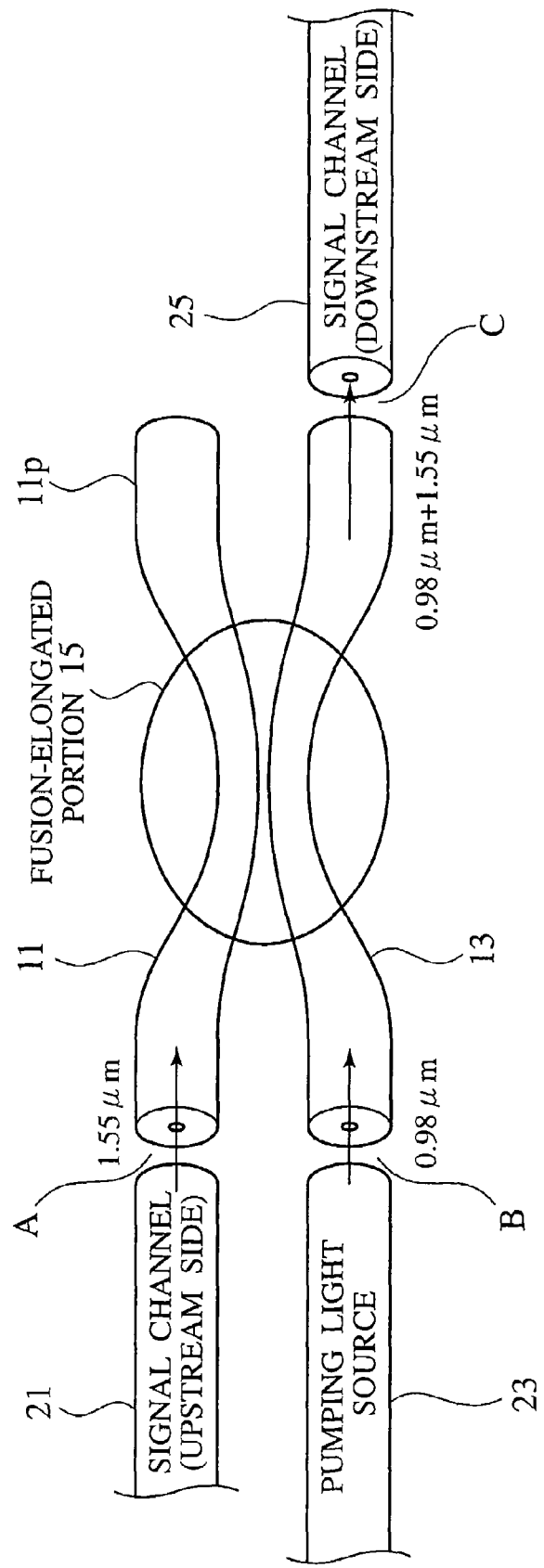
FIG. 1 shows an example of a first configuration of a conventional optical fiber coupler.
Figure 2:
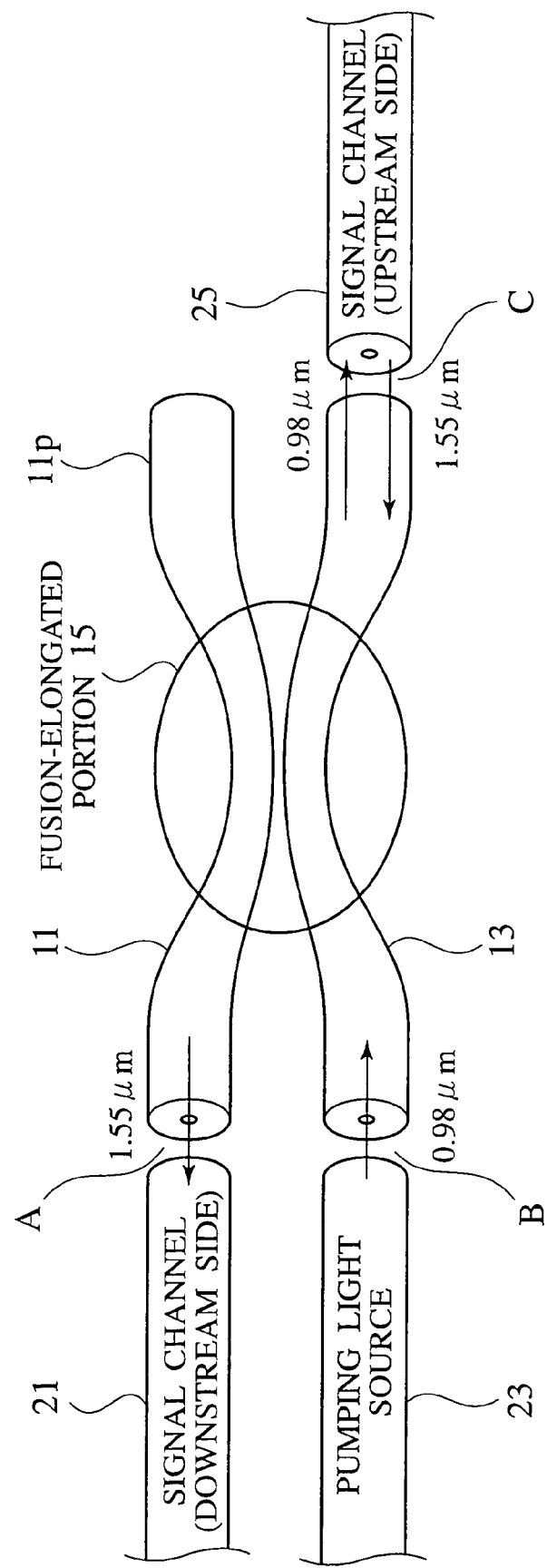
FIG. 2 shows an example of a second configuration of a conventional optical fiber coupler.

By improving the relative refractive-index profile of an optical fiber, the present invention provides an optical fiber that, while maintaining the characteristics of a 0.98 μ-band optical fiber (single mode for a wavelength in the vicinity of 0.98 μm and superior connectivity with 0.98 μm-band optical fiber) can be sufficiently strongly coupled, through fusion-elongating, with an 1.55 μm-band optical fiber.

Hereinafter, the theoretical background for this kind of optical fiber coupler and optical fiber for such an optical fiber coupler will be described and a detailed explanation of the embodiments of the invention will be provided with reference to the drawings.

<Theoretical Background>

(a) Coupling Strength of Symmetrical and Asymmetrical Couplers:

This explanation deals solely with theoretical points concerning same directional type couplers.

Where two waveguides 11 and 13 are drawn near to each other the mode of each waveguide is mutually coupled. The parameter F that determines the maximum value of this coupling is described as $$F = \frac{1}{1+(\delta_{12}/\kappa_{12})}, \quad (1)$$

$$\delta_{12} = \frac{\beta_2 - \beta_1}{2}, \quad (2)$$

$$\kappa_{12} = \frac{\omega\varepsilon_0 \int_{-\infty}^{\infty}\int_{-\infty}^{\infty}(N_1^2 - N_2^2)E_1^* \cdot E_2 dxdy}{\int_{-\infty}^{\infty}\int_{-\infty}^{\infty} u_z \cdot (E_1^* \times H_1 + E_1 \times H_1^*)dxdy}, \quad (3)$$

where the $\delta_{12}$ is ½ of the difference of the propagation constants of an eigen mode of waveguides 11 and 13. The $\kappa_{12}$ expresses the coupling constant for waveguides 11 and 13. More specifically, the $\beta_1$ and $\beta_2$ are the propagation constants for waveguide 11 and waveguide 13 respectively, the ω expresses the frequency of the lightwave, and the $\epsilon_0$ represents the dielectric constant of the vacuum. The $u_z$ is the unit vector of z-direction, $E_1^*$ and $H_1^*$ are the complex conjugates of electric field vector $E_1$ and magnetic field vector $H_1$ of the waveguide 11. $E_2$ is the electric field vector for the waveguide 13. The $N_1$ and $N_2$ show the refractive index distribution of each of the waveguides, respectively. Further the symbols "·" and "×" are the respective inner and vector products.

As it is an object of the present invention to couple a signal wave having a wavelength in the vicinity of 1.55 μm with a low loss (that is, reducing insertion loss) under conditions in which a coupling lightwave having a wavelength in the vicinity of 0.98 μm is sufficiently small, the maximum coupling ratio at a wavelength in the vicinity of 1.55 μm is preferably as close as possible to 1. In other words, the parameter F in eq. (1) is preferably brought as close as possible to 1. Therefore, it is apparent that in the condition after elongation of the respective waveguides 11 and 13 in eq. (1), the $\delta_{12}$ that is ½ of the difference of propagating constants of the waveguides 11 and 13, is preferably sufficiently small in comparison to the coupling constant $\kappa_{12}$.

In the case of a fusion-elongated type of optical fiber coupler, the coupling constant $\kappa_{12}$ is within the range from $10^{-4}$ rad/μm to $10^{-2}$ rad/μm in the case of strong fusion and within the range from $10^{-7}$ rad/μm to $10^{-5}$ rad/μm in the case of weak fusion. Accordingly, assuming the case of strong fusion, in order to achieve coupling with low loss of a signal wave having a wavelength in the vicinity of 1.55 μm, it is sufficient that the $\delta_{12}$ representing ½ the difference of the propagating constants of a 0.98 μm-band optical fiber and a 1.55 μm-band optical fiber in an optical fiber coupler is within the range from $10^{-5}$ rad/μm to $10^{-3}$ rad/μm.

Figure 7:
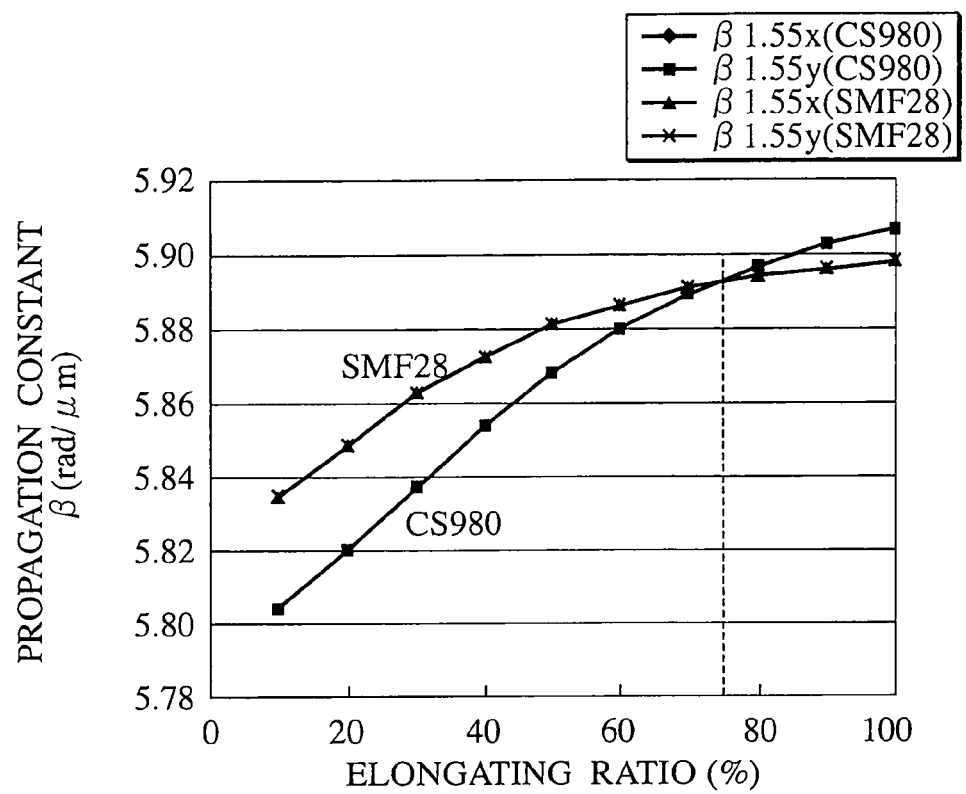
FIG. 7 is a graph showing results illustrating the transition of propagation constant β of a guided mode of the wavelength of 1.55 μm calculated for x polarization and y polarization, using a 1.55 μm-band optical fiber and a 0.98 μm-band optical fiber not fused and elongated as one optical fiber.

(b) The Difference of Propagating Constants where a 0.98 μm-Band Optical Fiber and a 1.55 μm-Band Optical Fiber are Fused and Elongated:

FIG. 7 is a graph showing results calculated illustrating the propagation constant β of a guided mode of the wavelength of 1.55 μm calculated for x polarization and y polarization, using a 1.55 μm-band optical fiber (Corning Inc. SMF28 equivalent) and a 0.98 μm-band optical fiber (Corning Inc. CS980 equivalent) which is simply elongated as one optical fiber (in other words, heated and stretched). The horizontal axis shows the elongating ratio, which illustrates how thin an optical fiber becomes in relation to the original condition thereof when elongated. An elongating ratio of 100% means that an optical fiber is not elongated. An elongating ratio of 50% means that, as a result of elongation, the outer diameter of the optical fiber has been reduced to half of the original diameter (62.5 μm). In FIG. 7, the values of the propagation constant β calculated for x polarization (the line: β1.55x (SMF28)) and y polarization (the line: β1.55y(SMF28)) for the 1.55 μm-band optical fiber nearly overlap. Similarly, the values of the propagation constant β calculated for x polarization (the line:β1.55x(CS980)) and y polarization (the line: β1.55y(CS980)) for the 0.98 μm-band optical fiber completely overlap.

Figure 8:
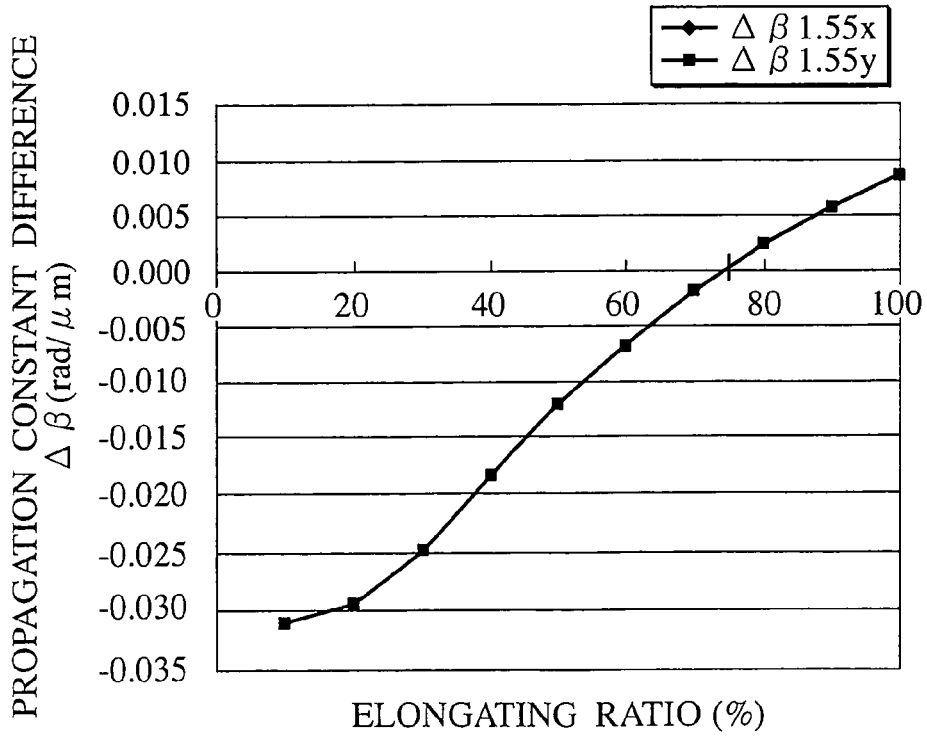
FIG. 8 is a graph showing the propagation constant difference Δβ for the two waveguide channels shown in FIG. 7 calculated for x polarization and y polarization.

FIG. 8 is a graph showing the difference of the propagation constant difference Δβ (≡2δ) for the two waveguide channels shown in FIG. 7 calculated for x polarization and y polarization. As can be understood from FIG. 8, at an elongating ratio of 75%, the value of the δ becomes 0, but where the elongating ratio is a value less than or greater than 75%, the δ is a value other than 0. It is thus understood that for the 1.55 μ-band optical fiber (SMF28 equivalent) and the 0.98 μm-band optical fiber (CS980 equivalent), the value of the δ equals 0 only at an elongating ratio of 75%, that is, the conditions for total coupling are present under such conditions. In FIG. 8, the values of the propagation constant difference Δβ for the two waveguide channels calculated for x polarization (the line: β1.55 x) and y polarization (the line: β1.55 y) completely overlap.

However because there is only this one point at which the value of the δ equals 0, it is apparent that there is only a small tolerance in the production process. Further, qualitatively, a small elongating ratio, in which an optical fiber is thin, corresponds to longer wavelength and a large elongating ratio, in which an optical fiber is thicker, corresponds to shorter wavelength. Accordingly, it is understood that as the longer wavelength side is stronger in mode coupling between two waveguides, insertion loss is highly dependent on wavelength. In a WDM coupler this is an undesirable characteristic because if wavelength characteristics in wavelength overall in the vicinity of 1.55 μm are not flat, and moreover the coupling strength is not as close as possible to 1, insertion loss of wavelengths in the vicinity of 1.55 μm and wavelength dependence will not be sufficiently small and flat. That is, under the conditions of fusion-elongation in the manufacture process, the elongation ratio dependence (or wavelength dependence) of the propagation constants β of the two kinds of optical fiber ideally should have the same absolute values, moreover these should be of an equivalent gradient (i.e. in FIG. 8, the respective lines plotted on the graph representing each of the two kinds of optical fiber should be in contact).

<An Exemplary Optical Fiber Coupler according to an Embodiment of the Present Invention>

Based on the theoretical background described above, an exemplary optical fiber coupler according to the present invention will now be described as an optical fiber coupler improved coupling strength of a 0.98 µm-band optical fiber with a 1.55 µm-band optical fiber through a modified relative refractive-index profile of the 0.98 µm-band optical fiber.

FIG. 3 schematically illustrates an optical fiber coupler comprised of different types of optical fibers according to an embodiment of the present invention. FIG. 3 illustrates a 0.98 µm/1.55 µm-band optical fiber coupler comprised of a 0.98 µm-band optical fiber and a 1.55 µm-band optical fiber (SMF 28 equivalent). The direction of the input incident and output light shown in FIG. 3 is that of a forward pumping system. In the case of a backward pumping system, the flow of the 1.55 µm signal light would be the opposite to that shown in FIG. 3.

While differences arise due to fusion conditions, except in the case of extremely strong fusion, it can be said that lightwave having a wavelength in the vicinity of 0.98 µm is not coupled across port (because under conditions in which the aspect ratio is within the range from 1.1 to 1.2, the coupling constant of a lightwave having a wavelength in the vicinity of 0.98 µm is a hundred or thousand times smaller than the coupling constant of a lightwave having a wavelength in the vicinity of 1.55 µm). Therefore here, coupling of a wavelength in the vicinity of 0.98 µm is not described, rather, the focus is on optimization of the coupling constant of a lightwave having a wavelength in the vicinity of 1.55 µm.

Figure 22:
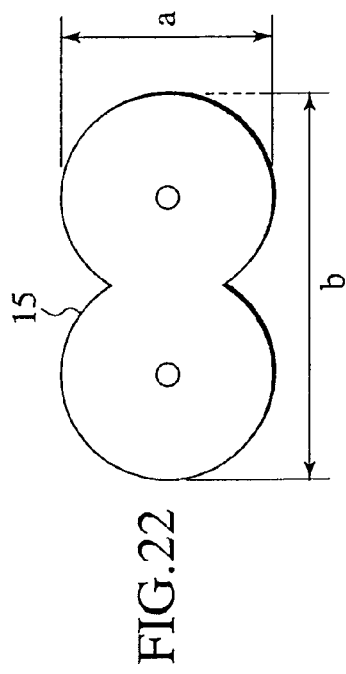
FIG. 22 shows the aspect ratio depicting the ratio of a major axis length and a minor axis length for a cross-sectional view of a fusion-elongated portion.

Fusion conditions as described herein refer to the various conditions of the elongation rate in the fusion-elongated portion of an optical fiber coupler, the elongation length (the length of the fusion-elongated portion), the tapered form of the elongated part, and the aspect ratio (that is, the ratio b/a of the length b of a major axis and the length a of a minor axis in the cross-sectional view of the fusion-elongated portion 15 shown in FIG. 22).

Figure 23:
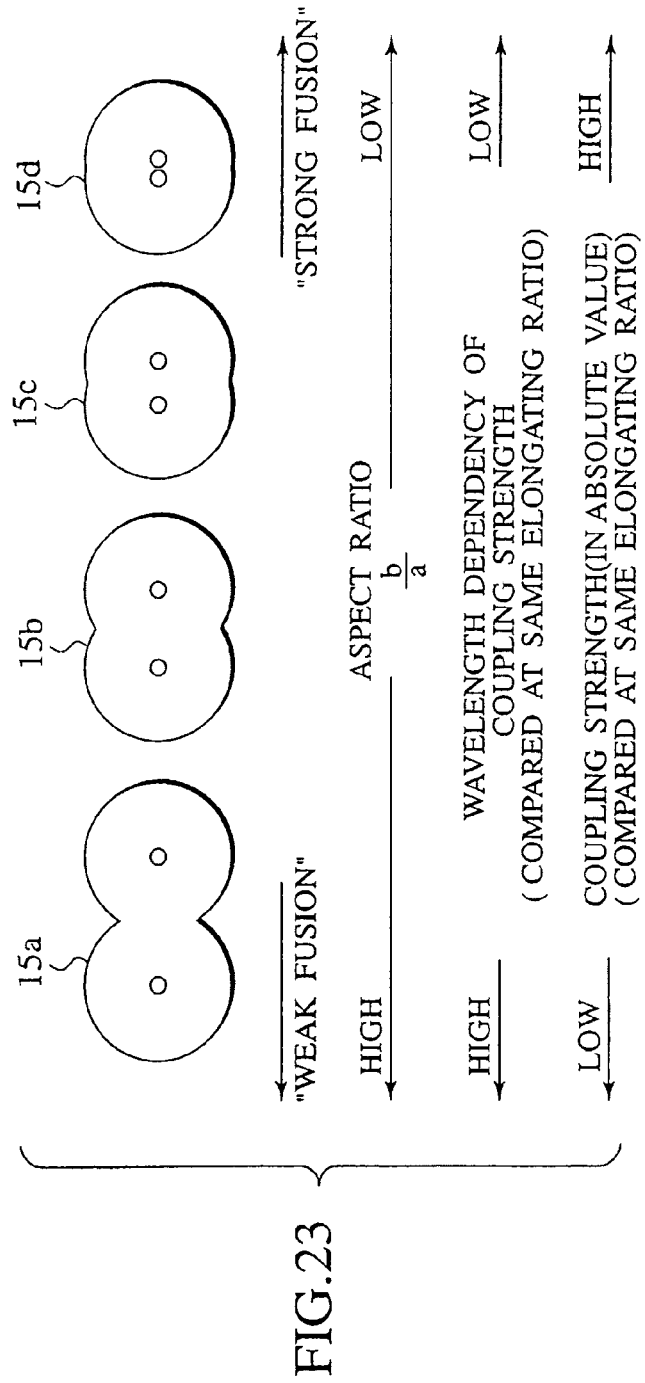
FIG. 23 shows the relationship between aspect ratio and strong and weak fusion.

If two optical fibers in contact with each other are heated up to the temperature at which glass becomes molten the two fibers are fused at the part at which the external surfaces of the respective claddings are in contact (the fusion-elongated portion 15a shown in FIG. 23). If the heating is continued, the gap between the two optical fibers continues becoming shallow due to actions such as the surface tension of the cladding surface and the like, such that the distance between the respective cores of the fibers is further reduced (the fusion-elongated portions 15b and 15c in FIG. 23). Finally, the gap between the two optical fibers completely disappears such that, what is largely a perfect circle shape viewed cross-sectionally, is formed (the fusion-elongated portion 15d in FIG. 23). Substantial utilization of this effect is termed strong fusion while weak fusion refers to the case in which this effect is not substantial. Accordingly, as shown in FIG. 23, the aspect ratio in the case of weak fusion is high (maximum b/a=2) and in the case of strong fusion the aspect ratio is low (minimum b/a=1). Further, as shown in FIG. 23, when a comparison is drawn at the same elongation rates, there is a high degree of wavelength dependence of coupling strength in the case of weak fusion and in the case of strong fusion the wavelength dependence of coupling strength is small. As further shown by FIG. 23, in the case of weak fusion, when a comparison is drawn at the same elongation rates, the coupling strength is small (in an absolute value), and in the case of strong fusion the coupling strength is substantial.

When optical fiber is actually produced the optimum form can be obtained by adjusting production conditions such as the heating temperature, the applied tension, the speed of the elongation and the like.

The optical fiber coupler shown in FIG. 3 comprises a fusion-elongated portion 15 in which a 1.55 µm-band optical fiber 11 and a 0.98 µm-band optical fiber 12 are fused and elongated. Signal light is incident from a 1.55 µm-band optical fiber 21 provided as a signal channel to the upstream side, via a splicing part A and into a port at one end of the 1.55 µm-band optical fiber 11. Pumping light is incident from a 0.98 µm-band optical fiber 23 provided as a pumping light source, via a splicing part B and into a port at one end of the 0.98 µm-band optical fiber 12. Coupled light having a wavelength in the vicinity of the 0.98 µm and pumping light and the signal light having a wavelength in the vicinity of 1.55 µm is incident from the port at the other end of the 0.98 µm-band optical fiber 12, via a splicing part C and into an EDF 25. A port 11p at the other end of the 1.55 µm-band optical fiber 11 is not used.

Figure 4A:
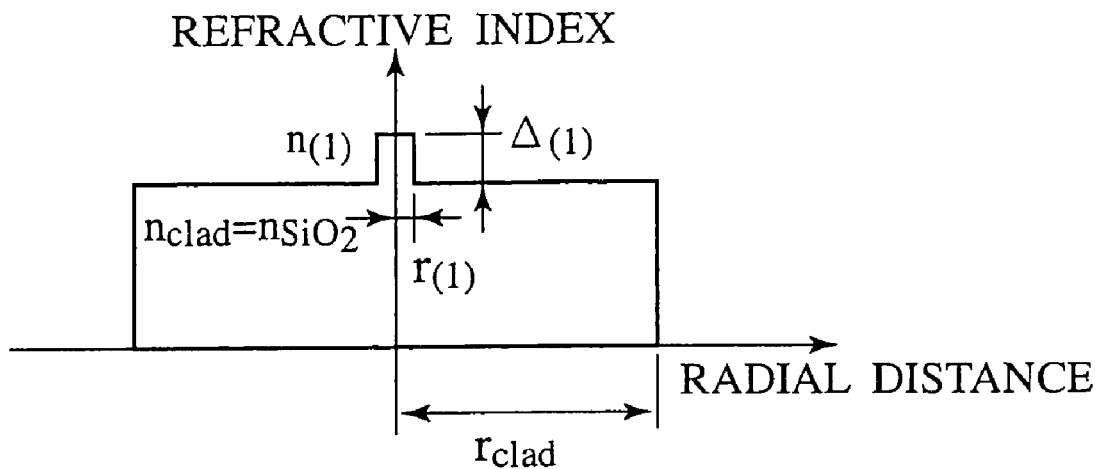
FIGS. 4A and 4B show the refractive index profile of a step index type optical fiber.
Figure 4B:
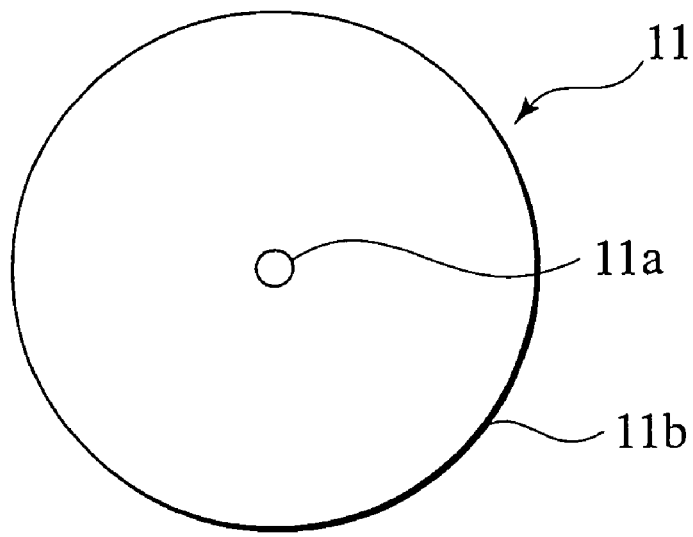

As shown in FIG. 4A, the 1.55 µm-band optical fiber 11 is an optical fiber having a step index type relative refractive-index profile and as shown in FIG. 4B. The optical fiber 11 comprises a first core 11a, and a cladding 11b arranged surrounding the first core 11a. As shown in FIG. 5B, the 0.98 µm-band optical fiber 12 comprises a first core 12a, a second core 12b arranged surrounding the first core 12a and a cladding 12c arranged surrounding the second core 12b.

In FIGS. 4A and 5A, the $n_{clad}$ shows the refractive index of the claddings 11b and 12c, $n_{(1)}$ shows the refractive indices of the first cores 11a and 12a and the $n_{(2)}$ shows the refractive index of the second core 12b. The $r_{clad}$ expresses the radius of the claddings 11b and 12c, $r_{(1)}$ is the radius of the first cores 11a and 12a and the $r_{(2)}$ is the radius of the second core 12b. The $\Delta_{(1)}$ shows the relative refractive-index difference illustrating the difference of the refractive indices of the first cores 11a and 12a and the claddings 11b and 12c. $\Delta_{(2)}$ shows the relative refractive-index difference illustrating the difference of the refractive-indices of the second core 12b and the cladding 12c. Here the relative refractive-index difference $\Delta$ is obtained by $$\Delta_{(i)} = \frac{n_{(i)}^2 - n_{clad}^2}{2n_{(i)}^2} \approx \frac{n_{(i)} - n_{clad}}{n_{(i)}}, \quad (4)$$

where the "i" represents the i-th core for i=1 or 2. Because this relative refractive-index difference is generally an extremely small value compared to 1, the value is normally multiplied by 100 and expressed as a percentage.

The 0.98 µm-band optical fiber 12 has an improved (changed) profile by providing the second core 12b to reduce the propagation constant difference of the optical fiber 12 and the optical fiber 11.

(a) Reduction of Propagation Constant Difference by Improving the Optical Fiber Profile:

The reduction of propagation constant difference due to improvement of the profile of the 0.98 µm-band optical fiber 12 will now be described.

Firstly, FIGS. 9 to 13 show results calculated for propagation constant β for guided modes when each of a variety of different optical fibers that are each elongated are used. Further, FIG. 6 is a table showing data on various aspects of different types of optical fibers used for calculating the propagation constant β.

Figure 9:
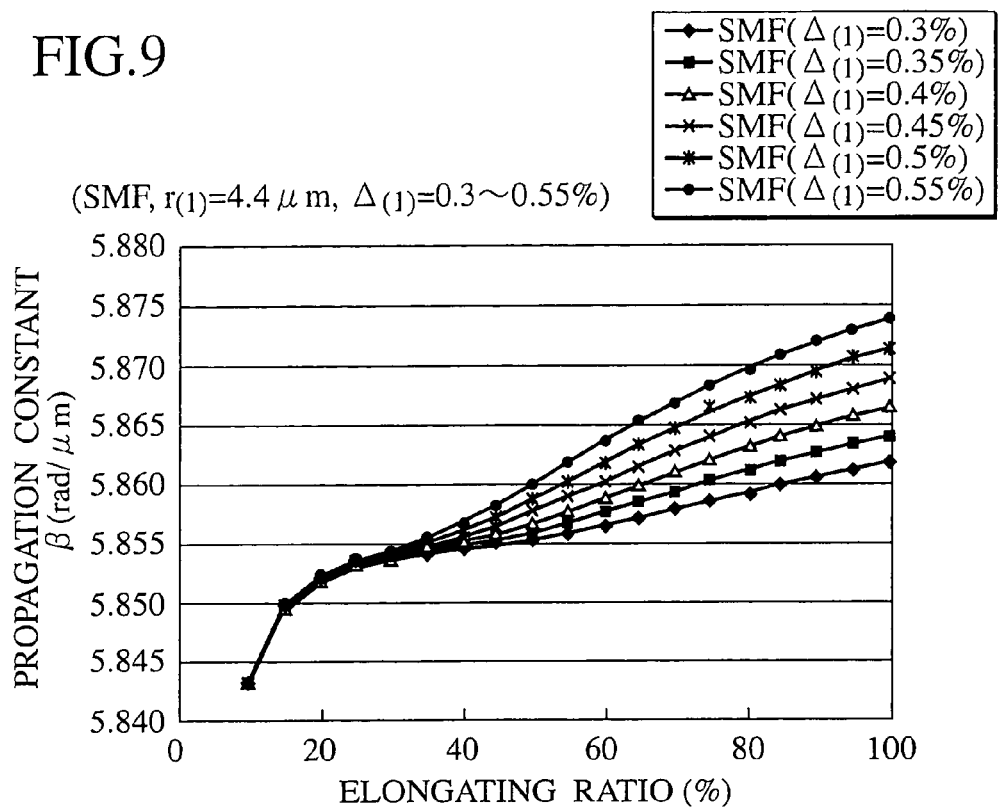
FIG. 9 shows results calculated for propagation constant β for a guided mode using a 1.55 μm-band single mode optical fiber (a product equivalent to SMF 28) and another optical fiber similar thereto, both fibers being elongated.

FIG. 9 shows results calculated for propagation constant β for a guided mode using a 1.55 µm-band single mode optical fiber (a product equivalent to SMF 28) and another optical fiber similar thereto, both fibers being elongated. In this example, the first core radius $r_{(1)}$ is 4.4 µm and the relative refractive-index difference $\Delta_{(1)}$ of the first core 11a and the cladding 11b is within the range from 0.3% to 0.55%.

Figure 10:
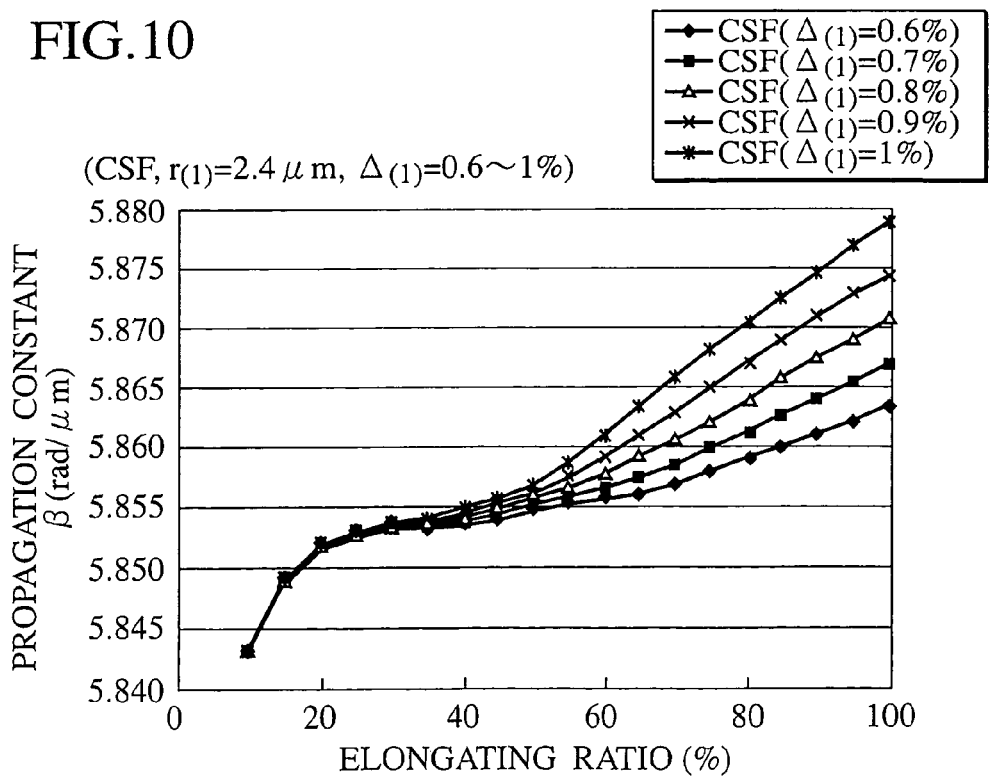
FIG. 10 shows results calculated for propagation constant β for a guided mode using a 0.98 μm-band single mode optical fiber (a product equivalent to CS980) and another optical fiber similar thereto both elongated.

FIG. 10 shows results calculated for propagation constant β for a guided mode using a 0.98 μm-band single mode optical fiber (a product equivalent to CS980) and another optical fiber similar thereto, both fibers being elongated. In this example, the first core radius $r_{(1)}$ is 2.4 μm and the relative refractive-index difference $\Delta_{(1)}$ of the first core 12a and the cladding 12c is within the range from 0.6% to 1%.

Figure 11:
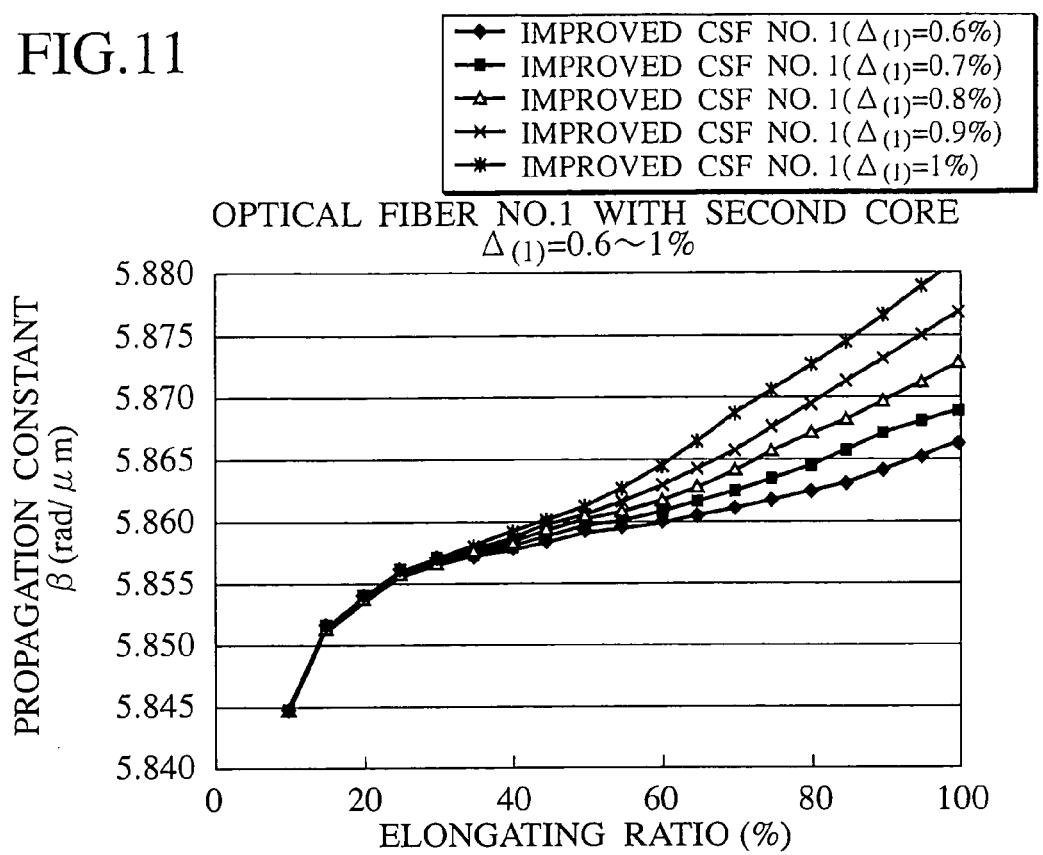
FIG. 11 shows results calculated for propagation constant β for a guided mode using an improved 0.98 μm-band optical fiber (example 1) that is elongated.

FIG. 11 shows results calculated for propagation constant β for a guided mode using an improved 0.98 μm-band optical fiber (example 1) that is elongated. In this example, the first core radius $r_{(1)}$ is 2.4 μm, the relative refractive-index difference $\Delta_{(1)}$ of the first core 12a and the cladding 12c is within the range from 0.6% to 1%, while the second core radius $r_{(2)}$ is 20 μm and the relative refractive-index difference $\Delta_{(2)}$ of the second core 12b and the cladding 12c is 0.1%.

Figure 12:
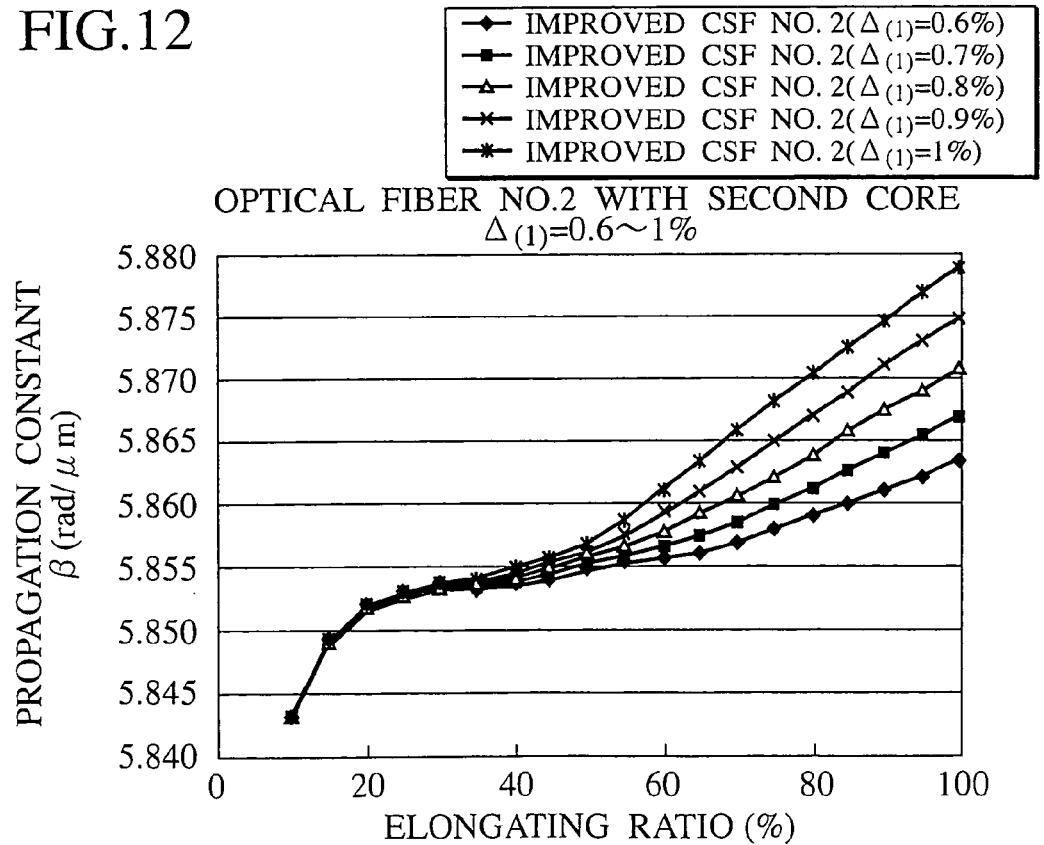
FIG. 12 shows results calculated for propagation constant β for a guided mode using an improved 0.98 μm-band optical fiber (example 2) that is elongated.

FIG. 12 shows results calculated for propagation constant β for a guided mode using an improved 0.98 μm-band optical fiber (example 2) that is elongated. In this example, the first core radius $r_{(1)}$ is 2.4 μm, the relative refractive-index difference $\Delta_{(1)}$ of the first core 12a and the cladding 12c is 0.6 to 1%, while the second core radius $r_{(2)}$ is 20 μm and the relative refractive-index difference $\Delta_{(2)}$ of the second core 12b and the cladding 12c is 0.02%.

Figure 13:
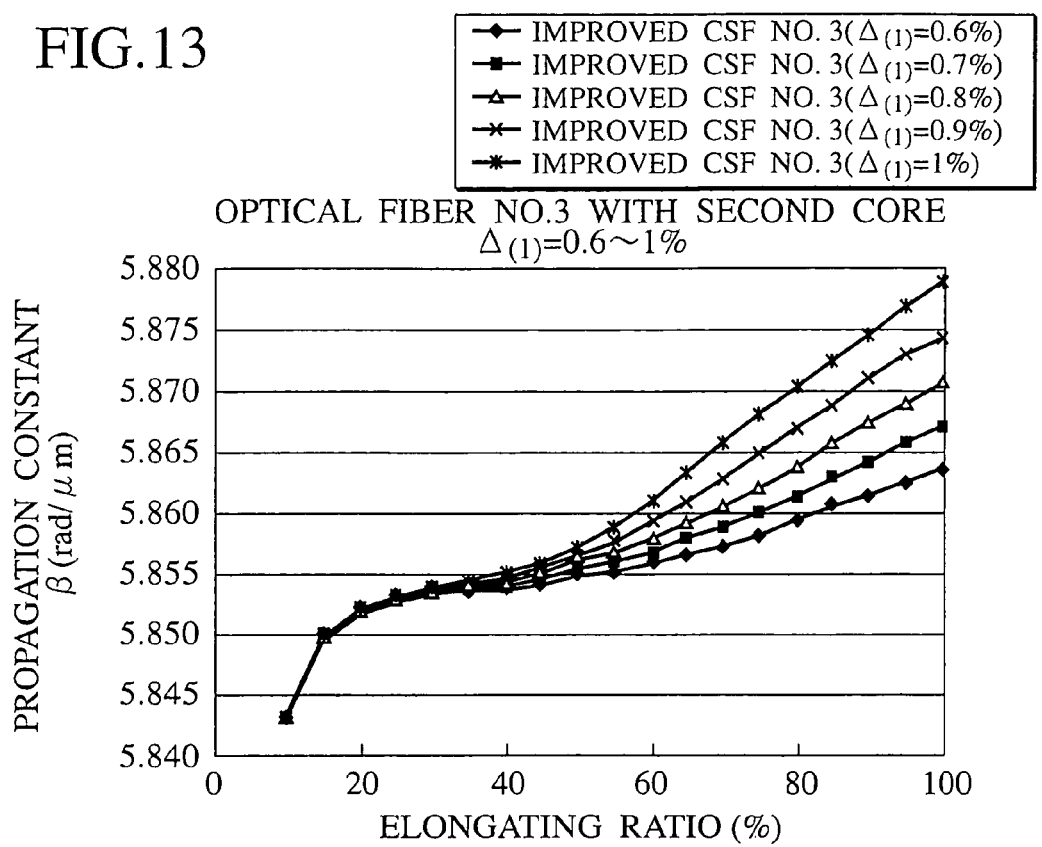
FIG. 13 shows results calculated for propagation constant β for a guided mode using an improved 0.98 μm-band optical fiber (example 3) that is elongated.

FIG. 13 shows results calculated for propagating constant β for a waveguide mode using an improved 0.98 μm-band optical fiber (example 3) that is elongated. In this example, the first core radius $r_{(1)}$ is 2.4 μm, the relative refractive-index difference $\Delta_{(1)}$ of the first core 12a and the cladding 12c is within the range from 0.6% to 1%, while the second core radius $r_{(2)}$ is 10 μm and the relative refractive-index difference $\Delta_{(2)}$ of the second core 12b and the cladding 12c is 0.02%.

In FIGS. 9 to 13 several types of fibers with relative refractive-index differences A were calculated in respect to each of the optical fibers to take account of possible-changes in the profile of the optical fibers (i.e. sagging in the profile, thermal diffusion in elements and the like) caused by heating at the time of elongation.

Here the absolute values for the 0.98 μm-band optical fiber and the 1.55 μm-band optical fiber differ at an elongation ratio in the vicinity of the range from 50% to 10% (the value for the 0.98 μm-band optical fiber being somewhat smaller), but the gradients indicated by their respective data plottings are largely similar. Accordingly, with the explanation provided hereinbefore of the theoretical background in view, the relative propagation constant difference Δβ of the 0.98 μm-band optical fiber and the 1.55 μm-band optical fiber can be reduced by effecting a vertical direction shift of these curves (in the direction to change the propagating constant β). Changing the profile of the optical fiber was investigated here to obtain a shift of these curves in a vertical direction.

It is sufficient to increase the refractive index of the optical fiber overall, especially the clad to increase the propagation constant β. However due to considerations of the environmental resistance properties and the mechanical reliability of optical fibers, it is preferable that the most external layer of the optical fiber be of pure $SiO_2$ (quartz). If another element is added to adjust the relative refractive-index ratio this generally leads to deterioration in the environmental resistance properties and the mechanical reliability of the optical fiber. Thus, the second core 12b provides a region with a higher refractive index than the cladding 12c around the first core 12a of the 0.98 μm-band optical fiber.

(b) First Embodiment for Reduction of Propagation Constant Difference Δβ:

FIGS. 14 to 17 show elongation ratio dependence of the propagation constant difference Δβ of the 0.98 μm-band optical fiber shown in FIGS. 10 to 13 and the 1.55 μ-band single mode optical fiber (Δ=0.35%) shown in FIG. 9.

Figure 14:
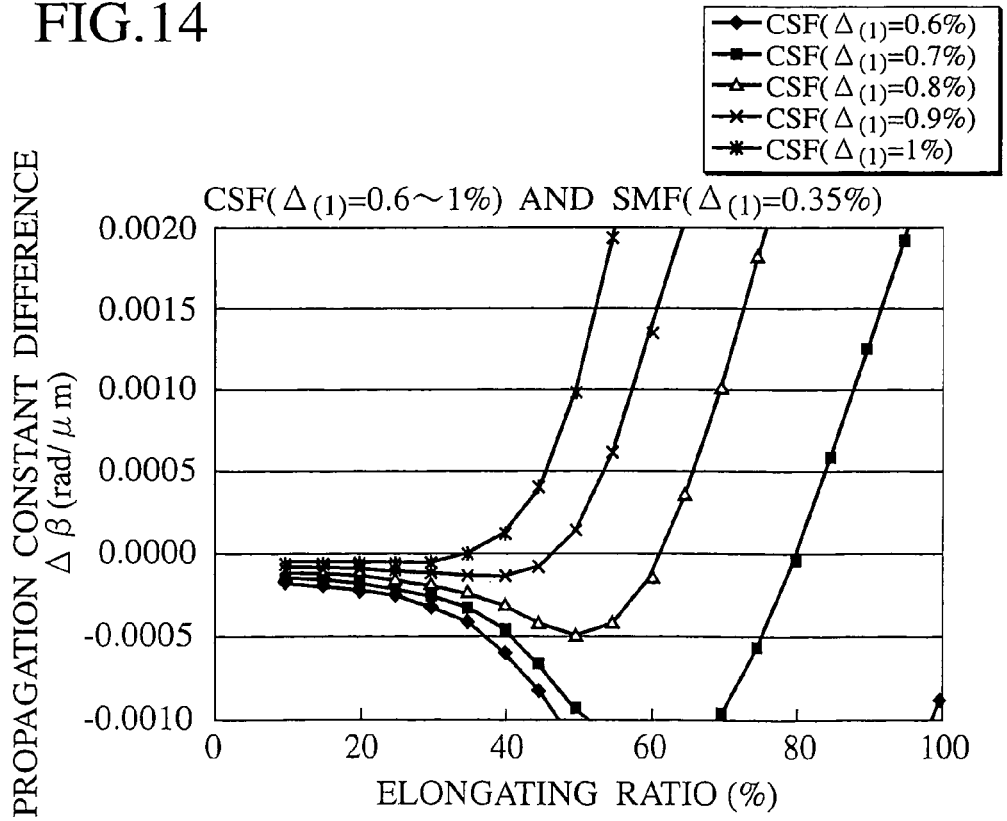
FIG. 14 shows elongation ratio dependence of the propagation constant difference Δβ for the 1.55 μm-band single mode optical fiber shown in FIG. 9 (Δ=0.35%) and the 0.98 μm-band optical fiber shown in FIG. 10.
Figure 15:
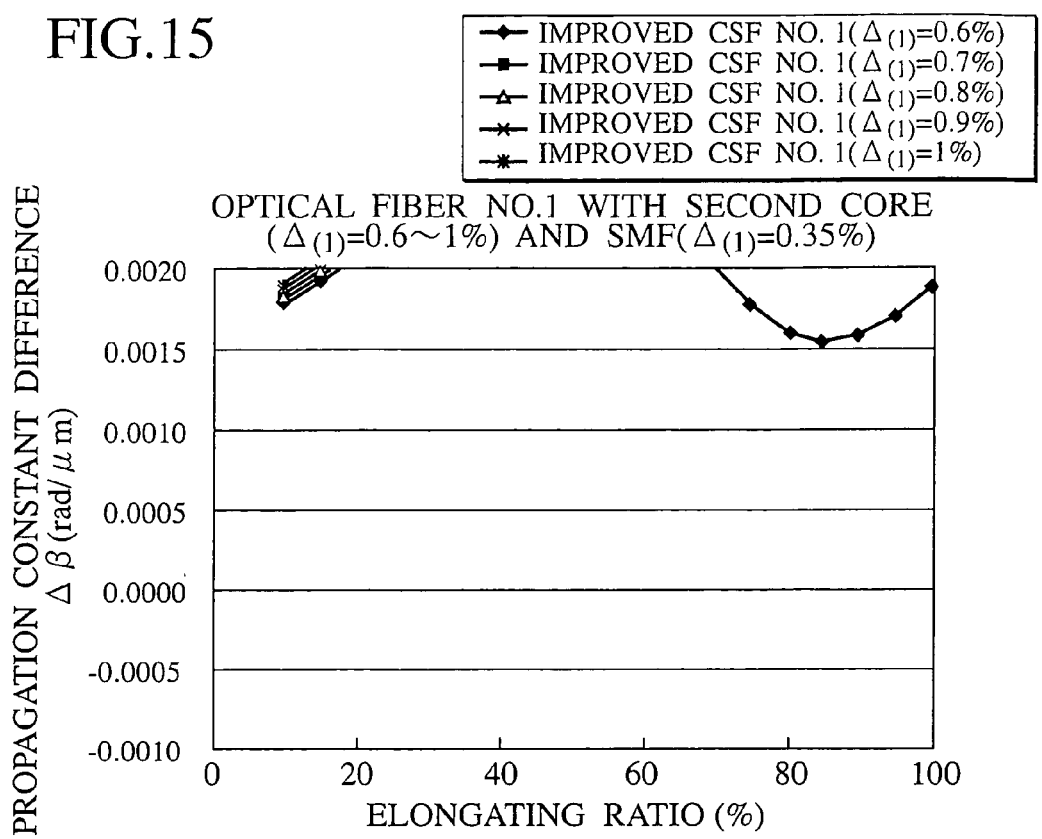
FIG. 15 shows elongation ratio dependence of the propagation constant difference Δβ for the 1.55 μm-band single mode optical fiber shown in FIG. 9 (Δ=0.35%) and the improved 0.98 μm-band optical fiber (example 1) shown in FIG. 11.

FIG. 14 shows elongation ratio dependence of the propagation constant difference Δβ for the 1.55 μm-band single mode optical fiber shown in FIG. 9 (Δ=0.35%) and the 0.98 μm-band optical fiber shown in FIG. 10. FIG. 15 shows elongation ratio dependence of the propagation constant difference Δβ for the 1.55 μm-band single mode optical fiber shown in FIG. 9 (Δ=0.35%) and the improved 0.98 μm-band optical fiber (example 1) shown in FIG. 11.

Figure 16:
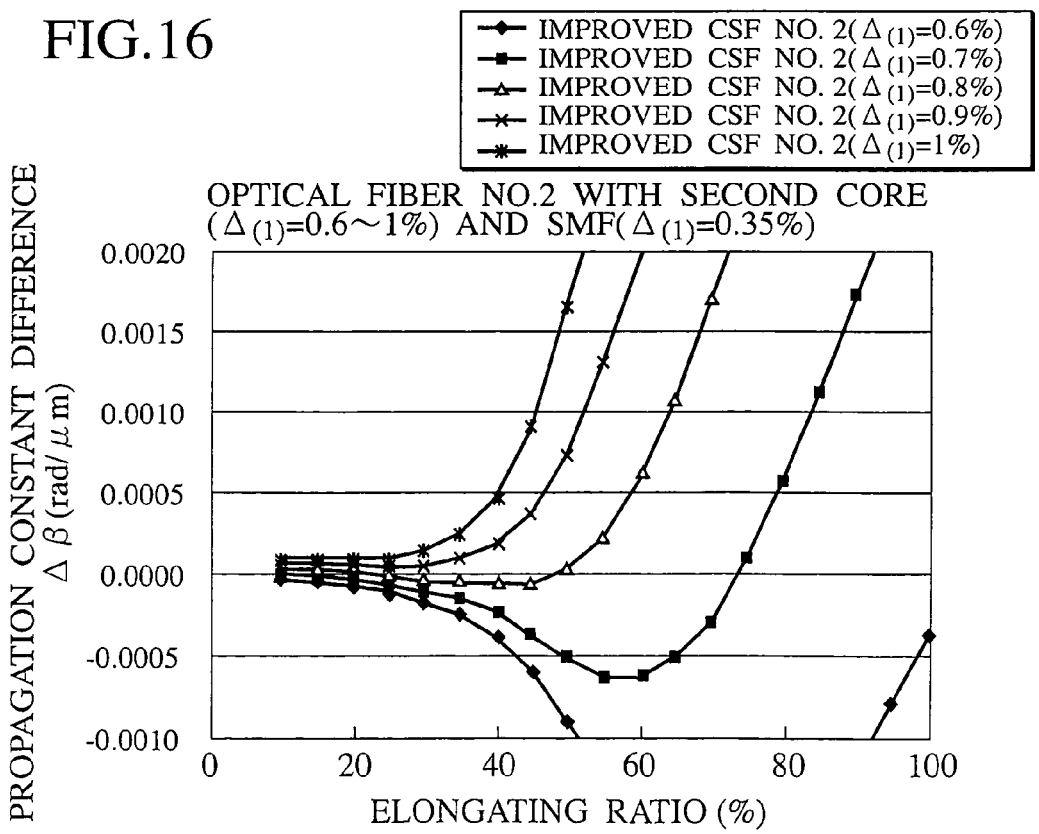
FIG. 16 shows elongation ratio dependence of the propagation constant difference Δβ for the 1.55 μm-band single mode optical fiber shown in FIG. 9 (Δ=0.35%) and the improved 0.98 μm-band optical fiber (example 2) shown in FIG. 12.
Figure 17:
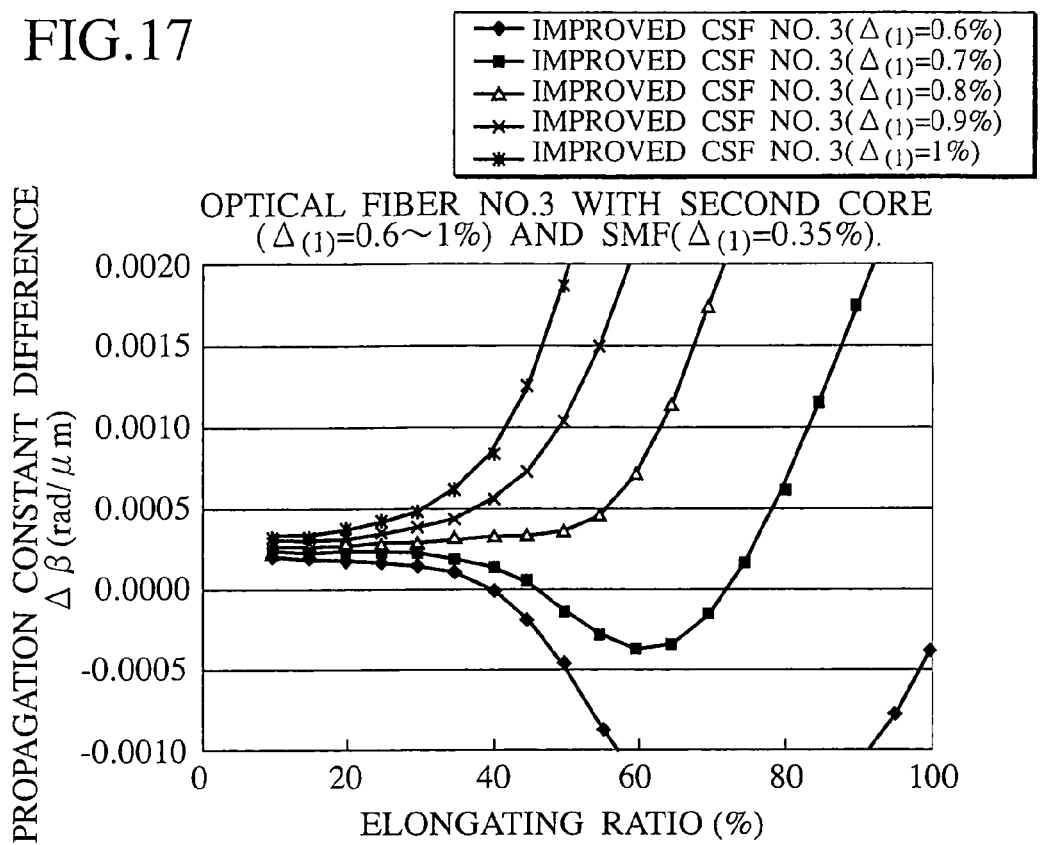
FIG. 17 shows elongation ratio dependence of the propagation constant difference Δβ for the 1.55 μm-band single mode optical fiber shown in FIG. 9 (Δ=0.35%) and the improved 0.98 μm-band optical fiber (example 3) shown in FIG. 13.

FIG. 16 shows elongation ratio dependence of the propagation constant difference Δβ for the 1.55 μm-band single mode optical fiber shown in FIG. 9 (Δ=0.35%) and the improved 0.98 μm-band optical fiber (example 2) shown in FIG. 12. FIG. 17 shows elongation ratio dependence of the propagation constant difference Δβ for the 1.55 μm-band single mode optical fiber shown in FIG. 9 (Δ=0.35%) and the improved 0.98 μm-band optical fiber (example 3) shown in FIG. 13.

As shown in FIG. 16, for the improved 0.98 μm-band optical fiber (example 2), (having a first core 12a with a relative refractive-index difference $\Delta_{(1)}$ of 0.8% to the cladding 12c, a second core radius $r_{(2)}$ of 20 μm and a second core 12b with a relative refractive-index difference $\Delta_{(2)}$ of 0.02% to the clad 12c, in the region where the elongation ratio is 50% or smaller, the propagation constant difference Δβ is at most $10^{-4}$ rad/μm. Under these conditions 1.55 μm cross port insertion loss can be reduced.

Further, it is evident that in the region where the elongation rate is 50% or smaller, in order to make the propagation constant difference Δβ equal to $10^{-4}$ rad/μm or smaller, the radius $r_{(2)}$ of the second core is preferably 10 μm or greater and the relative refractive-index difference $\Delta_{(2)}$ of the second core 12b and the cladding 12c is preferably 0.1% or smaller. Moreover it is shown that when the relative refractive-index difference $\Delta_{(1)}$ of the first core 12a of the 1.55 μm-band optical fiber 11 used for combination with the 0.98 μm-band optical fiber 12 is 0.35%, the relative refractive-index difference $\Delta_{(1)}$ of the first core 12a of the 0.98 μm-band optical fiber 12 and the cladding 12c is preferably within the range from 0.7% to 0.9%.

(c) Second Embodiment for Reduction of Propagating Constant Difference Δβ:

FIGS. 18 to 21 show the results of elongation ratio dependence of the propagation constant difference Δβ of the 0.98 μm-band optical fiber shown in FIGS. 10 to 13 and the 1.55 μm-band single mode optical fiber (Δ=0.3%) shown in FIG. 9.

Figure 18:
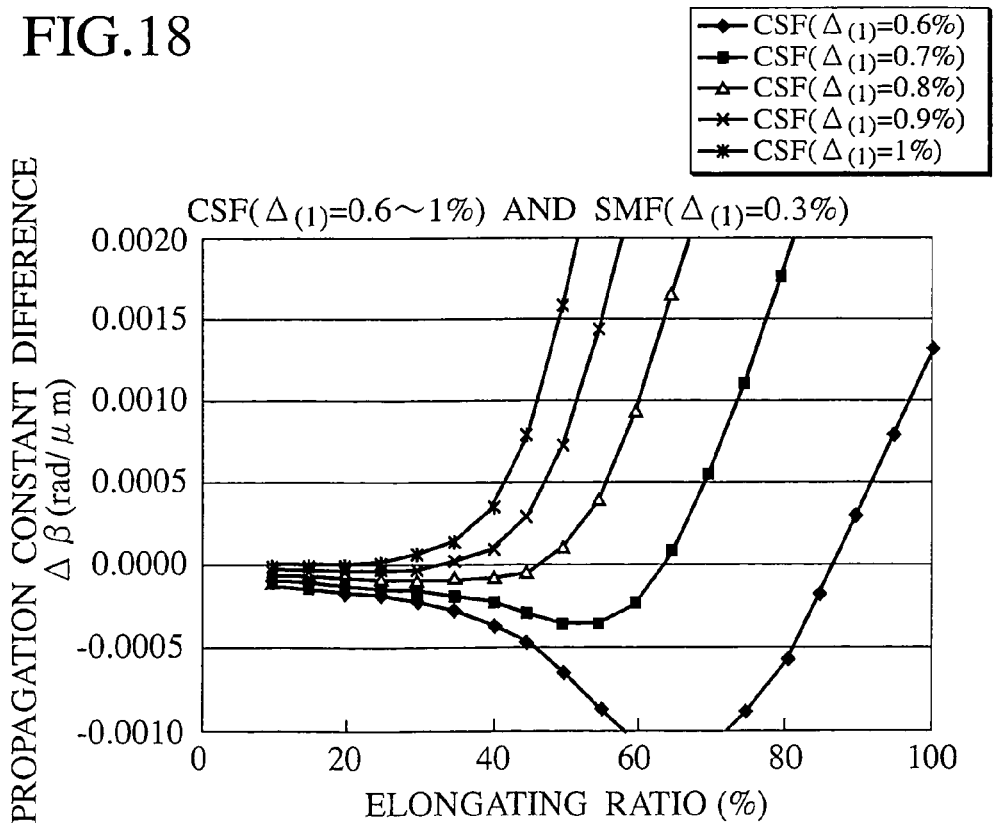
FIG. 18 shows elongation ratio dependence of the propagation constant difference Δβ for the 1.55 μm-band single mode optical fiber shown in FIG. 9 (Δ=0.3%) and the 0.98 μm-band optical fiber shown in FIG. 10.
Figure 19:
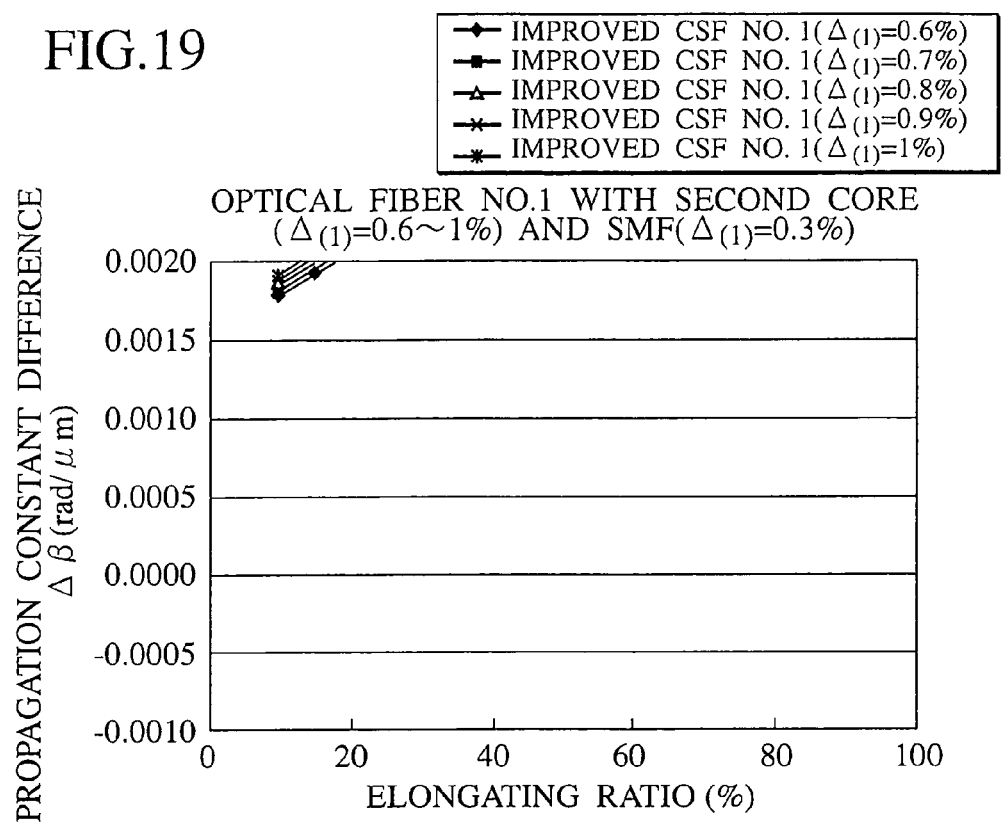
FIG. 19 shows elongation ratio dependence of the propagation constant difference Δβ for the 1.55 μm-band single mode optical fiber shown in FIG. 9 (Δ=0.3%) and the improved 0.98 μm-band optical fiber (example 1) shown in FIG. 11.

FIG. 18 shows elongation ratio dependence of the propagation constant difference Δβ for the 1.55 μm-band single mode optical fiber shown in FIG. 9 (Δ=0.3%) and the 0.98 μm-band optical fiber shown in FIG. 10. FIG. 19 shows elongation ratio dependence of the propagation constant difference Δβ for the 1.55 μm-band single mode optical fiber shown in FIG. 9 (Δ=0.3%) and the improved 0.98 μm-band optical fiber (example 1) shown in FIG. 11.

Figure 20:
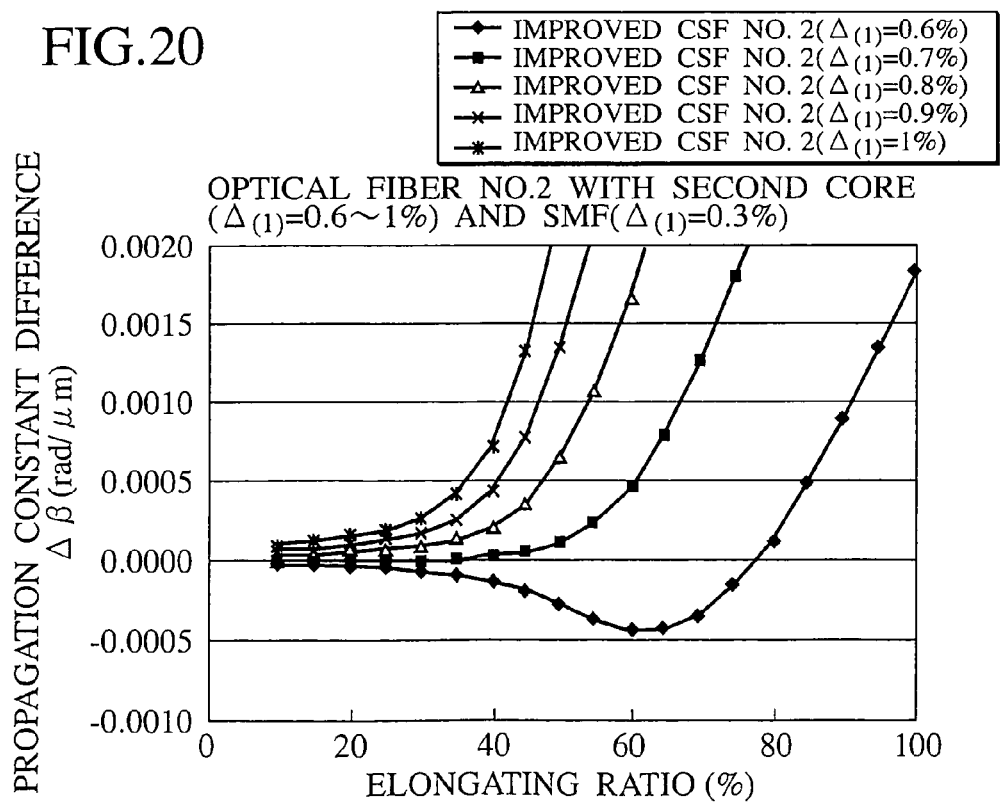
FIG. 20 shows elongation ratio dependence of the propagation constant difference Δβ for the 1.55 μm-band single mode optical fiber shown in FIG. 9 (Δ=0.3%) and the improved 0.98 μm-band optical fiber (example 2) shown in FIG. 12.
Figure 21:
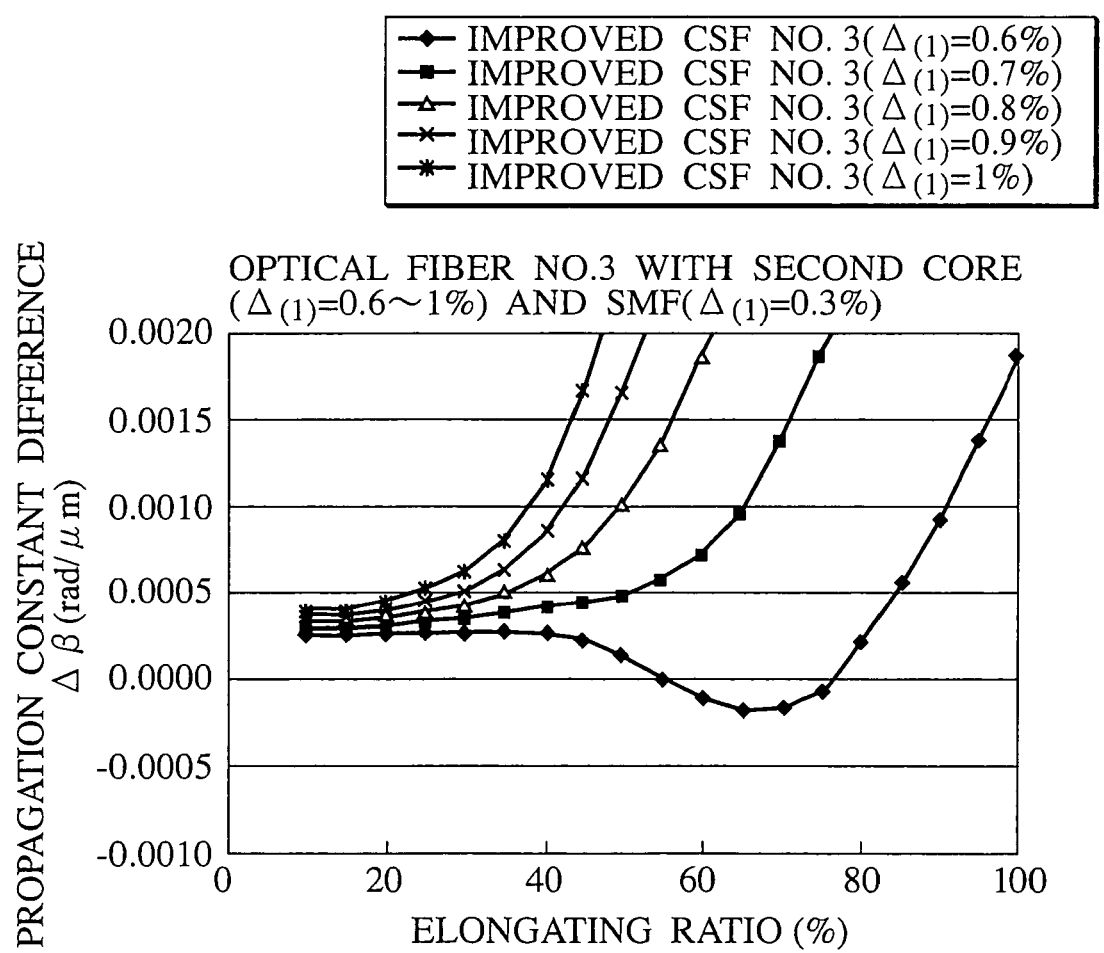
FIG. 21 shows elongation ratio dependence of the propagation constant difference Δβ for the 1.55 μm-band single mode optical fiber shown in FIG. 9 (Δ=0.3%) and the improved 0.98 μm-band optical fiber (example 3) shown in FIG. 13.

FIG. 20 shows elongation ratio dependence of the propagation constant difference Δβ for the 1.55 μm-band single mode optical fiber shown in FIG. 9 (Δ=0.3%) and the improved 0.98 μm-band optical fiber (example 2) μm shown in FIG. 12. FIG. 21 shows elongation ratio dependence of the propagation constant difference Δβ for the 1.55 μm-band single mode optical fiber shown in FIG. 9 (Δ=0.3%) and the improved 0.98 μm-band optical fiber (example 3) μm shown in FIG. 13.

As shown in FIG. 20, for the improved 0.98 μm-band optical fiber (example 2), (having a first core 12a with a relative refractive-index difference $\Delta_{(1)}$ of 0.7% to the cladding 12c), in the region where the elongation ratio is 50% or smaller, the propagation constant difference $\Delta\beta$ is $10^{-4}$ rad/μm or smaller. Here, where the elongation ratio is 50% or smaller to make the propagation constant difference $\Delta\beta$ equal to $10^{-4}$ rad/μm or smaller, the radius $r_{(2)}$ of the second core is preferably 10 μm or greater and the relative refractive-index difference $\Delta_{(2)}$ of the second core 12b and the cladding 12c is preferably 0.1% or smaller. Moreover, it is shown that when the relative refractive-index difference $\Delta_{(1)}$ of the first core 12a of the 1.55 μm-band optical fiber 11 used for combination with the 0.98 μm-band optical fiber 12 is 0.3%, the relative refractive-index difference $\Delta_{(1)}$ of the first core 12a of the 0.98 μm-band fiber 12 is preferably within the range from 0.6% to 0.8%.

As described, a 0.98 μm/1.55 μm-band optical fiber coupler having a low loss, formed of a 1.55 μm-band single mode optical fiber and an improved 0.98 μm-band optical fiber can be realized. That is, the present invention provides optical fiber for an optical fiber coupler and a low insertion loss, fusion-elongated type optical fiber coupler that realize superior optical characteristics (coupling characteristics for a lightwave having a wavelength in the vicinity of 1.55 μm) and superior connectivity with input/output optical fibers (low coupling loss).

Moreover, as described, when actually designing an optical fiber, incorporating results calculated on the optical fiber profile after fusion and elongation, it is necessary to consider profile changes (sagging of the refractive index profile) caused by heating at the time of elongation. Further as the optimum profile of improved 0.98 μm-band optical fiber changes in accordance with the profile 1.55 μm-band optical fiber being coupled thereto (combined), these profile changes is preferably considered during the design phase.

It is contemplated that numerous modifications may be made to the embodiments and implementations of the present invention without departing from the spirit and scope of the invention as defined in the following claims.

What is claimed is:

1. An optical fiber coupler comprising:
   a plurality of optical fibers including a $\lambda_1$-band optical fiber and a $\lambda_2$-band optical fiber, fused together at a fusion-elongated portion,
   wherein the $\lambda_1$-band and $\lambda_2$-band optical fibers in the plurality of optical fibers have a propagation constant difference between the $\lambda_1$-band and $\lambda_2$-band optical fibers in the fusion elongation portion of $1\times10^{-4}$ rad/m or smaller at a fusion elongating ratio in a range of 50% or less, and
   wherein the $\lambda_1$-band is different from the $\lambda_2$-band.

2. An optical fiber coupler as recited in claim 1,
   wherein at least outside the fusion-elongated portion, is a single mode optical fiber at a wavelength of about 0.98 μm,
   wherein at least outside the fusion-elongated portion, the $\lambda_1$-band optical fiber comprises a first core, a second core surrounding the first core and having a radius of 10 μm or greater, and a cladding surrounding the second core, and
   wherein a relative refractive-index difference of the second core and the cladding is 0.1% or smaller.

3. An optical fiber coupler according to claim 2, wherein a relative refractive-index difference of the first core and the cladding is within a range from 0.6% to 0.9%.

4. An optical fiber coupler according to claim 3, wherein the $\lambda_2$-band optical fiber is a single mode optical fiber at a wavelength of about 1.55 μm.

5. An optical fiber coupler as recited in claim 1,
   wherein the $\lambda_1$-band optical fiber has a first core with a radius of $r_1$, a second core with a radius of $r_2$ surrounding the first core, and a cladding surrounding the second core;
   wherein the $\lambda_2$-band optical fiber includes a core with a radius of $r_3$, and a cladding surrounding the core;
   wherein the $\lambda_1$-band is lower in wavelength than the $\lambda_2$-band, and
   wherein $r_1 < r_3 \leq r_2$.

6. An optical fiber coupler according to claim 5, wherein a relative refractive-index difference of the second core and the cladding of the $\lambda_2$-band optical fiber is 0.1% or smaller.

7. An optical fiber coupler according to claim 5, wherein a relative refractive-index difference of the first core and the cladding of the $\lambda_1$-band optical fiber is within a range from 0.7% to 0.9%.

8. An optical fiber coupler according to claim 5, wherein said $\lambda_2$-band optical fiber is a single mode optical fiber at a wavelength in the vicinity of 0.98 μm, and said $\lambda_2$-band optical fiber is a single mode optical fiber at a wavelength in the vicinity of 1.55 μm.

* * * * *

UNITED STATES PATENT AND TRADEMARK OFFICE
CERTIFICATE OF CORRECTION

PATENT NO.        : 7,450,802 B2
APPLICATION NO. : 10/760374
DATED             : November 11, 2008
INVENTOR(S)       : Yuu Ishii, Ryokichi Matsumoto and Daiichiro Tanaka It is certified that error appears in the above-identified patent and that said Letters Patent is hereby corrected as shown below:

Column 12, line 1 change "1x $10^{-4}$ rad/m" to --1x$10^{-4}$ rad/μm--

Signed and Sealed this

Thirty-first Day of March, 2009

JOHN DOLL
*Acting Director of the United States Patent and Trademark Office*